United States Patent
Cu et al.

(10) Patent No.: US 10,717,199 B2
(45) Date of Patent: Jul. 21, 2020

(54) SPRING-SUPPORT MECHANISM FOR PARALLEL ROBOTS

(71) Applicant: VIETTEL GROUP, Ha Noi (VN)

(72) Inventors: Xuan Hung Cu, Pho Yen Town (VN); Xuan Thao Dang, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 0 days.

(21) Appl. No.: 16/235,160

(22) Filed: Dec. 28, 2018

(65) Prior Publication Data

US 2020/0001474 A1    Jan. 2, 2020

(30) Foreign Application Priority Data

Jun. 28, 2018    (VN) .............................. 1-2018-02814

(51) Int. Cl.
| | | |
|---|---|---|
| *F16M 11/20* | (2006.01) | |
| *B25J 19/00* | (2006.01) | |
| *F16H 21/44* | (2006.01) | |
| *F16F 3/04* | (2006.01) | |
| *F16M 11/12* | (2006.01) | |

(52) U.S. Cl.
CPC ............. *B25J 19/0016* (2013.01); *F16F 3/04* (2013.01); *F16H 21/44* (2013.01); *F16M 11/121* (2013.01); *F16M 11/2042* (2013.01); *F16F 2228/001* (2013.01); *F16M 2200/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,906,524 | A * | 9/1959 | Oakes | F16F 3/04 267/173 |
| 3,288,421 | A * | 11/1966 | Peterson | B23Q 1/5462 248/396 |
| 5,987,726 | A * | 11/1999 | Akeel | B23P 19/105 29/407.08 |
| 6,196,081 | B1 * | 3/2001 | Yau | B23Q 1/5462 248/651 |
| 6,330,837 | B1 * | 12/2001 | Charles | B25J 11/00 74/490.06 |
| 6,516,681 | B1 * | 2/2003 | Pierrot | B25J 17/0266 74/490.01 |
| 7,543,989 | B2 * | 6/2009 | Hoth | A61B 6/0457 378/177 |
| 8,215,199 | B2 * | 7/2012 | Marcroft | B25J 17/0216 74/490.08 |
| 8,403,673 | B2 * | 3/2013 | Atluri | G09B 9/14 434/55 |

(Continued)

*Primary Examiner* — Monica E Millner
(74) *Attorney, Agent, or Firm* — patenttm.us

(57) ABSTRACT

The purpose of the presented invention propose a spring-support mechanism for the parallel robot, and this mechanism is applied to parallel robot models to reduce the load on the actuators. The spring-support mechanism for the parallel robot are composed of: sets of rotated joints to adjust the direction of the support mechanism to match the direction of the moving frame of robot, rhombus mechanism with hinges in four vertices transform displacement of moving frame to elasticity of springs, guiding plates used to adjust the springs length so that the thrust force generated by springs is constant, set of springs is assembled parallel and fixtures for the springs.

4 Claims, 11 Drawing Sheets

(56) References Cited

U.S. PATENT DOCUMENTS

| | | | | |
|---|---|---|---|---|
| 8,973,460 | B2* | 3/2015 | Duplouy | B25J 17/0266 |
| | | | | 74/490.04 |
| 9,296,113 | B2* | 3/2016 | Peng | B25J 17/0266 |
| 9,737,985 | B2* | 8/2017 | Wu | B25J 9/003 |
| 2002/0029610 | A1* | 3/2002 | Chrystall | A43D 999/00 |
| | | | | 73/7 |
| 2004/0144288 | A1* | 7/2004 | Chiang | A47B 91/16 |
| | | | | 108/1 |

* cited by examiner

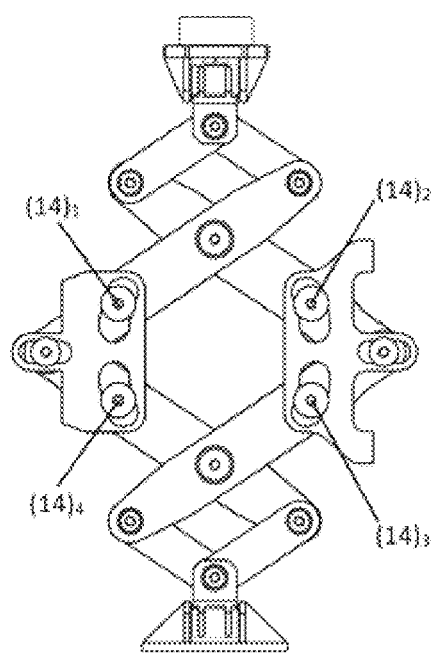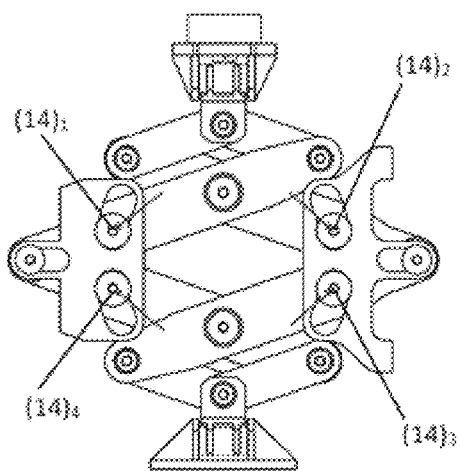
Figure 14.a                Figure 14.b

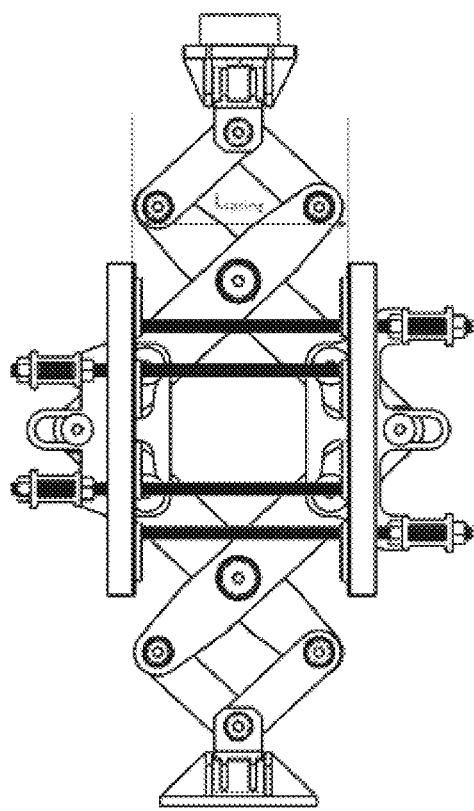
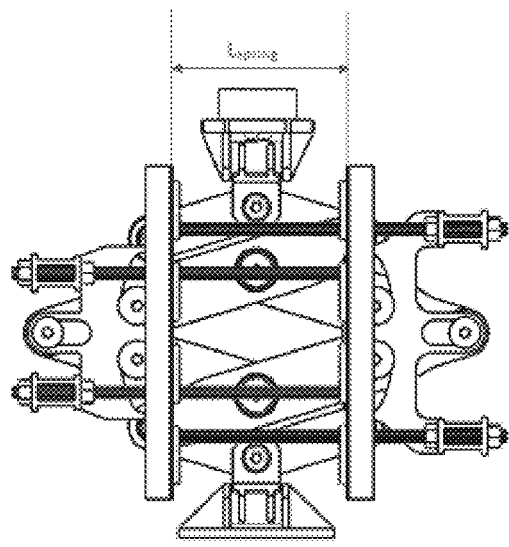
Figure 15.a                Figure 15.b

SPRING-SUPPORT MECHANISM FOR PARALLEL ROBOTS

BACKGROUND OF THE INVENTION

The invention relates to a spring-support mechanism for a parallel robot with constant force. Specifically, a spring-support mechanism for parallel robot with constant force as mentioned in the invention transforms elastic force of the springs into thrust force on the moving frame of the parallel robot, and this thrust force has a constant magnitude in the workspace of the moving frame.

Parallel robot is supported by a spring without a transforming mechanism (FIG. 1), this spring generates a thrust force varying with the compression length of the spring. So in the whole workspace of parallel robot, this thrust force is greatly altered by the position of the moving frame. This support force does not diminish the effect of loading on the robot's actuator, significantly. Direct spring support is only suitable for small displacement robots, thrust force of this spring doesn't change a lot in a small workspace. While robots with large displacement are difficult to apply, effectively.

Therefore, this invention comprises a mechanism that transforms the elastic force of the springs into the thrust force of the parallel robot to balance the gravity of the load placed on the moving frame. By creating constant thrust, it will greatly reduce impact of gravity of load on the parallel robot's actuator. Especially for robots where acceleration of the moving frame is smaller than gravity acceleration, the main driving force on the driving actuators is the gravity of the load, the thrust force generated from the spring-support mechanism eliminates most of the gravity effect of the load. Consequently, the force on the driving actuators is mainly a force to accelerate the movement of the moving frame (not including the gravity of load).

SUMMARY OF THE INVENTION

The purpose of this invention proposes a spring-support mechanism for the parallel robot, and this mechanism is applied to parallel robot models to reduce the load on the actuators.

To achieve the above purpose, the spring-support mechanism for the parallel robot is composed of: sets of rotated joints to adjust the direction of the support mechanism to match the direction of the moving frame of robot, rhombus mechanism with hinges in four vertices transform displacement of moving frame onto elasticity of springs, guiding plates used to adjust the springs length so that the thrust force generated by springs is constant, set of springs is assembled parallel and fixtures for the springs.

In this invention, the load of the moving frame through the rotated joint impacts a compression force on a pair of vertices of the rhombus, the other two vertices through the guiding plate and the spring fixture squeezes the spring, the compressive force of the springs equal to the load impacting on the rhombus structure. The slider guiding path and the rhombus dimension is calculated to satisfy the following equation with $F_{load}$ is a constant:

$$F_{elastic}d_{spring} = F_{load}d_z$$

$F_{elastic}$: the elastic force of the springs
$F_{load}$: the force of the load impact on the support mechanism
$d_{spring}$: differential displacement of springs
$d_z$: the differential displacement of the moving frame

KEY TECHNICAL FEATURES

The spring-support mechanism for a parallel robot comprising: Sets of rotated joints to adjust the direction of the support mechanism to match a direction of a moving frame of the robot; Rhombus mechanism with hinges in four vertices for transforming a displacement of the moving frame to an elasticity of springs, said springs having a length; Guiding plates used to adjust the length of the springs so that a thrust force generated by the springs is constant; wherein the set of springs is assembled parallel, and comprising fixtures for the springs.

BRIEF DESCRIPTION OF THE DRAWINGS

FIG. 14a and FIG. 14b illustrate the principle of the reciprocal motion of the support structure (1);
FIG. 15a and FIG. 15b illustrate the principle of the reciprocal motion of the support structure (2)

DETAILED DESCRIPTION OF THE PREFERRED EMBODIMENT

Figure 1:
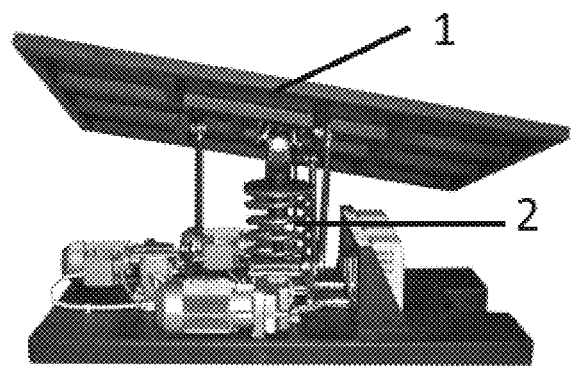
FIG. 1: 3 degree of freedom robot with a direct support spring.
Figure 2:
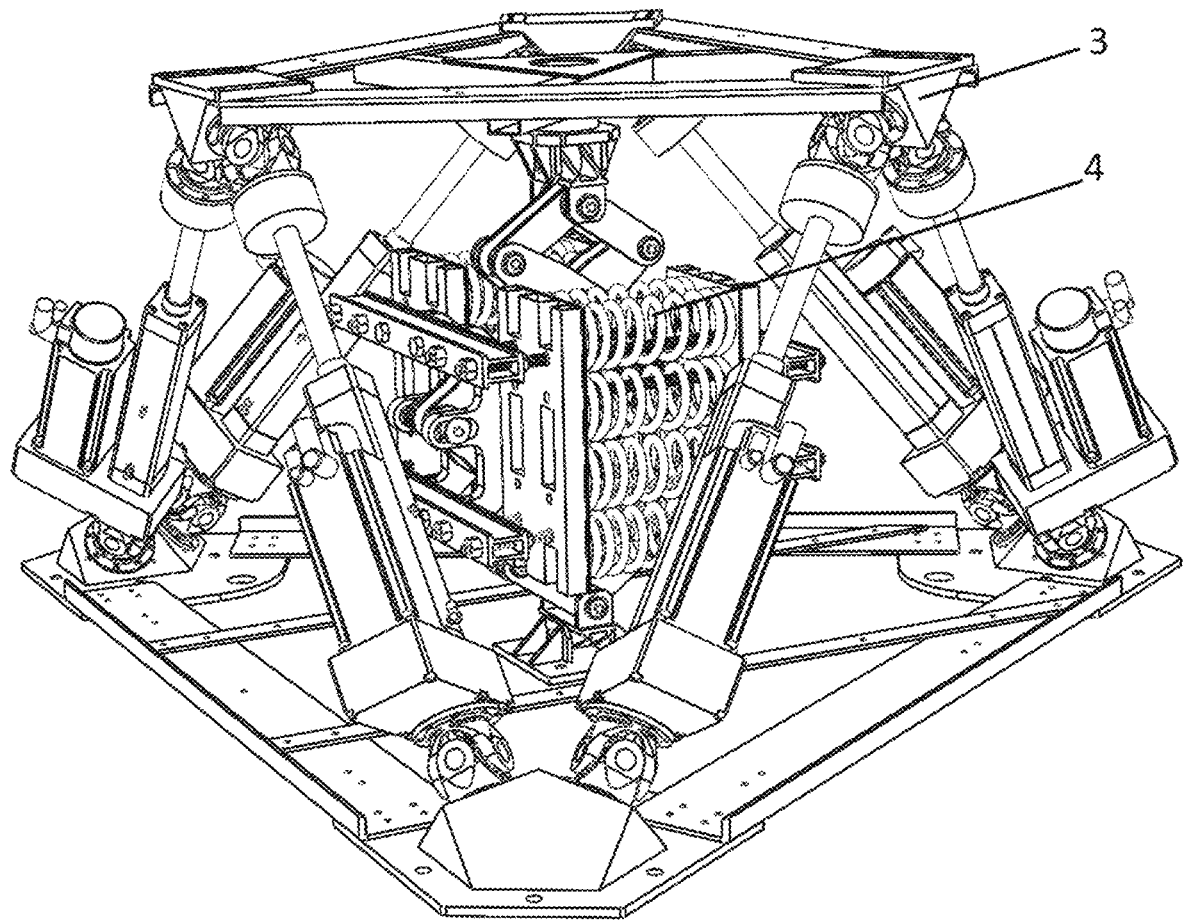
FIG. 2: 6 degree of freedom robot is supported by springs with constant force.
Figure 3:
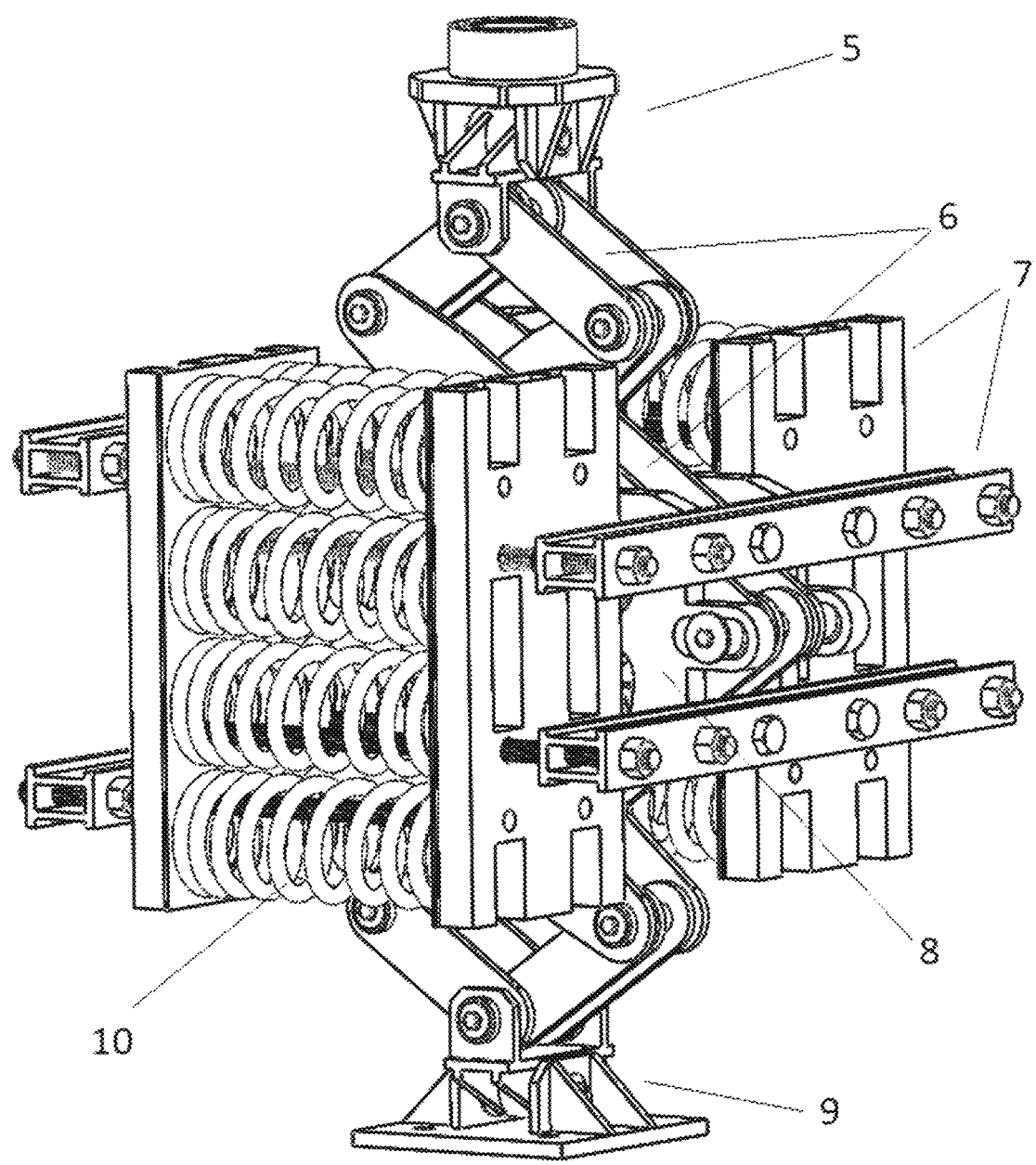
FIG. 3: a spring-support mechanism generates constant force.
Figure 8:
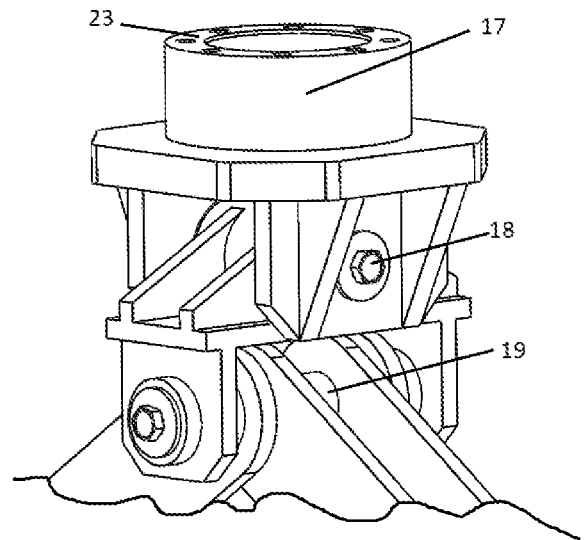
FIG. 8: cluster of upper rotated joints.
Figure 9:
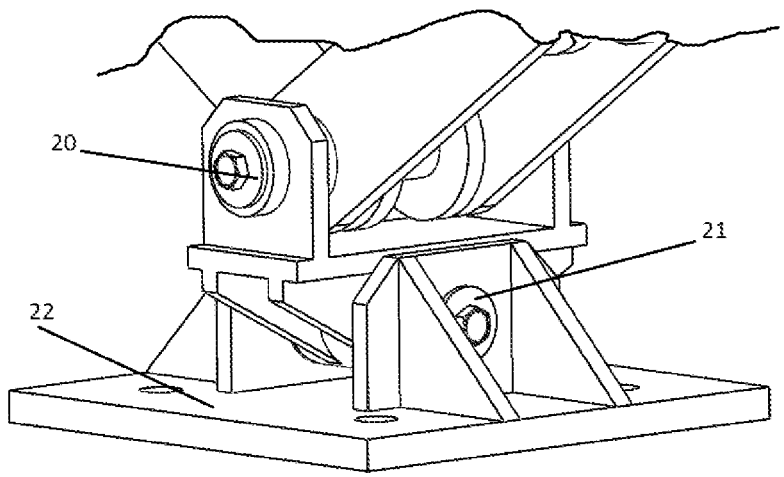
FIG. 9: cluster of lower rotated joints.
Figure 10:
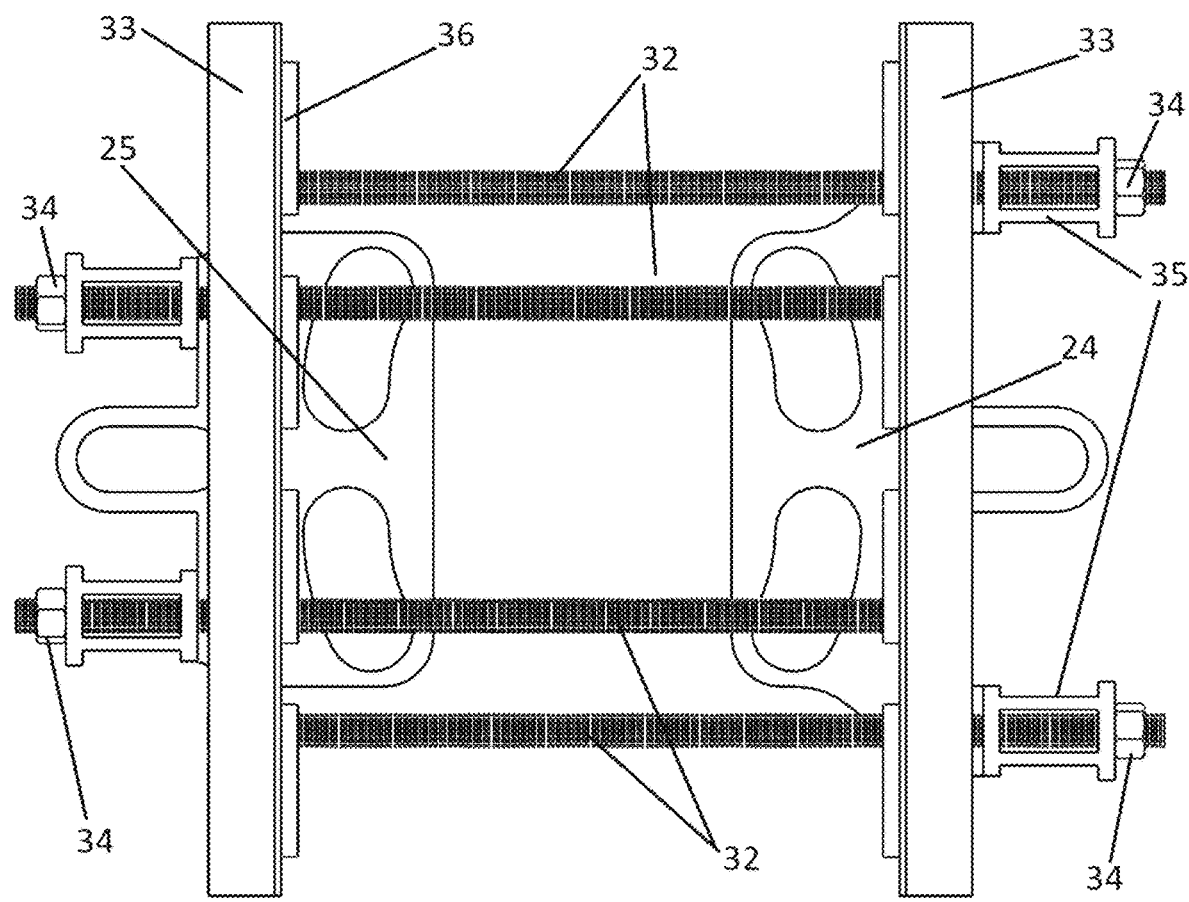
FIG. 10: cluster of spring-fixtures and guide plates.

The spring-support mechanism (4) generates a constant force that is integrated into the parallel robot system as shown in FIGS. 1, 2 and 3, cluster of upper rotated joints (5) of the support mechanism accompany with the moving frame (3) of the robot, a cluster of lower rotated joints (9) is fixed to the ground. The support mechanism is likely a 7th actuator that always generates a constant force in the workspace of the robot to balance the gravity of the load. The spring-support mechanism for parallel robot with constant force consists of the following components:

Clusters of rotated joints: refer to FIGS. 8 and 9, the cluster of upper rotated joints (5) consisting of three rotated joints, including the x-axis rotated joint (19), the y-axis rotated joint (18), the z-axis rotated joint (17) and on the z-axis rotated joint with a flanged surface (23) to connect to the robot's moving frame. The cluster of lower rotated joints (9) consists of two rotated joints, including the x-axis rotated joint (20), the y-axis rotated joint (21) and the flanged surface (22) to connect to the ground. Because the moving frame of the 6 degree of freedom robot can move in three directions x, y, z and rotate three angles around the x, y, and z axes, so the actuators need rotated joints at the both end to not constrain the degree of freedom of robot, similar to actuators which also has a three-axis joints at the top connected to the moving frame and two-axis joints on the bottom connected to the ground. Rotated joint is hinge, which uses bushings or needle roller bearings because of the high load carrying capacity and slow motion and to reduce the size of the system.

Figure 4:
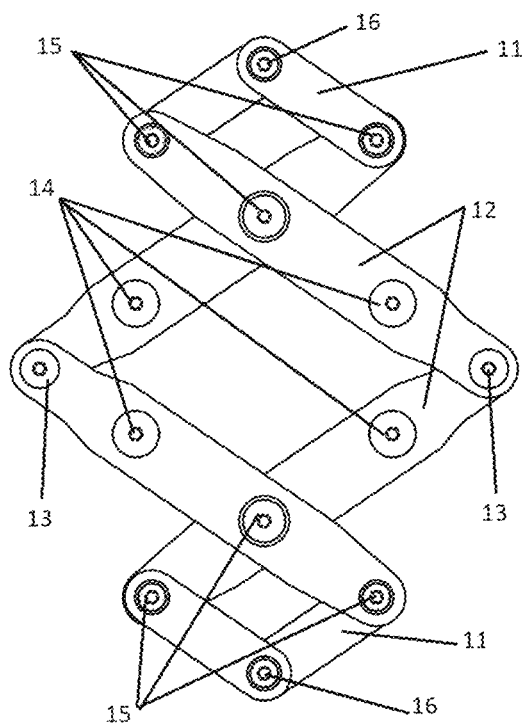
FIG. 4: a rhombus structure.
Figure 5:
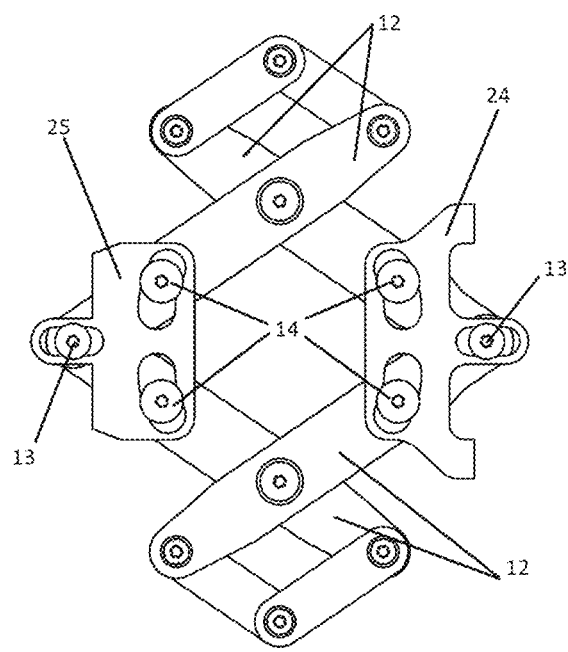
FIG. 5: a rhombus structure and two guiding plates.

A cluster of rhombus structure: Refer to FIGS. 4 and 5, a cluster of rhombus structure consist of three rhombuses, including a large rhombus and two small rhombuses. The rhombus structure are made up of four short edge (11) and four long edge (12), the edges are joined by hinge joints (15) and (16) at the vertices of the rhombuses. These hinges are similar to those used in cluster of rotated joints, they are used bushings or needle roller bearings for compact size. The hinge joint (16) is also used to connect to cluster of upper rotated joints (5) and cluster of lower rotated joints (9), the axis of these hinge joints being the axis of the x-axis rotated joint (19) and (20). At the long edge of the rhombus (12), there are four pivots (14) and two pivots (13) which contact with right guiding groove (26) and (27), the left guiding groove (28) and (29) in FIG. 6 and FIG. 7. The cylinder pin (13) engages the hinge joint of the rhombus and slides in the guiding groove (27), (29). The structure of rhombus and two guiding plate is assembled such as FIG. 5.

Figure 6:
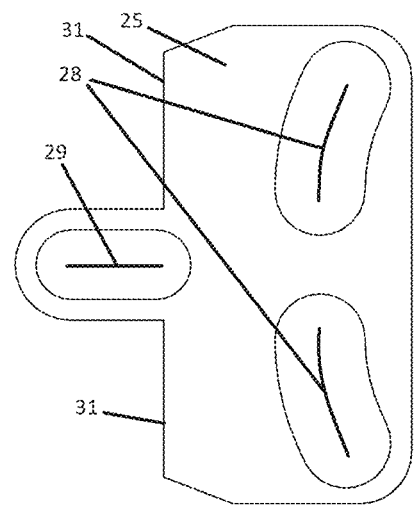
FIG. 6: a left-side guiding plate.
Figure 7:
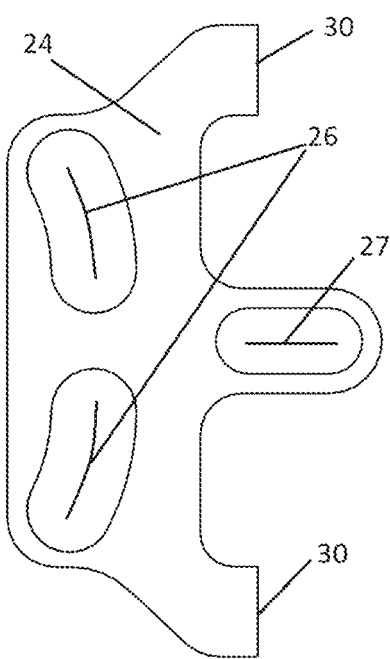
FIG. 7: a right-side guiding plate.

Guiding Structure: Refer to FIGS. 6 and 7, which consists of a guiding plate (24) and a guiding plate (25). On the right guide plate (24) there is a rightward curved guiding groove (26) comprising two symmetrical grooves and a straight guiding groove (27), a flange (30) on the right guiding plate (24) for connection to the beam (35) on the spring fixtures. Similar to the right plate, the left guiding plate (25) also has a left curved groove (28), a straight groove (29) and a flange (31). The right curved guiding groove (26) and the left curved guiding groove (28) are symmetrical. Two plates are connected to the rhombus structure by contact between the guide grooves (26), (27), (28), (29) with the pivots (13) and (14) FIG. 5. The guiding plates are connected to the springs by contact between the flange (30) and the beam (35) can be seen in FIG. 11, FIG. 12, FIG. 13. The center line of grooves (27), (29) is the straight line, the center line of the groove (26), (28) has a trajectory that is calculated from the following equation:

$$F_{elastic} d_{spring} = F_{load} d_z$$

$F_{elastic}$: the elastic force of the springs.

$F_{load}$: the force of the load impact on the support mechanism.

$d_{spring}$: differential displacement of springs (total displacement due to rhombus structure and adjustment of guiding groove).

$d_z$: The differential displacement of the moving frame.

$d_{spring}$ is calculated by the following formula:

$$d_{spring} = d_{rhombus} + d_{groove}$$

$d_{rhombus}$ differential displacement of pivots (14), depends on the texture, length of the edges of the rhombus.

$d_{groove}$ differential displacement of trajectory of groove (26), (28).

$F_{load}$ is gravity value of the load, for $d_z$ is the displacement of moving frame of robot, $d_{rhombus}$ will be a function of $d_z$ when we give the length of the edge, and the position of pivot (14), and a condition $X_{spring}(0) = z(0) = 0$ we can calculate the trajectory of grooves $d_{groove}$ (26), (28).

Figure 11:
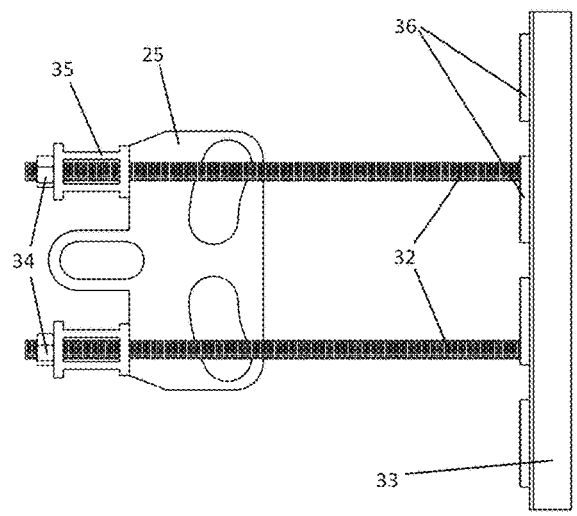
FIG. 11: the left-spring-fixture.
Figure 12:
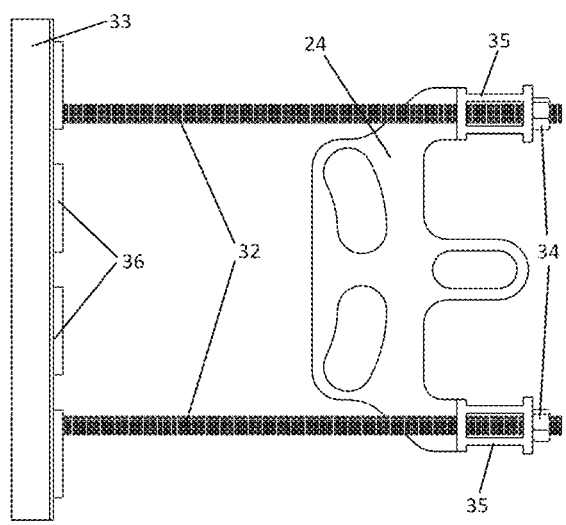
FIG. 12: the right-spring-fixture.
Figure 13:
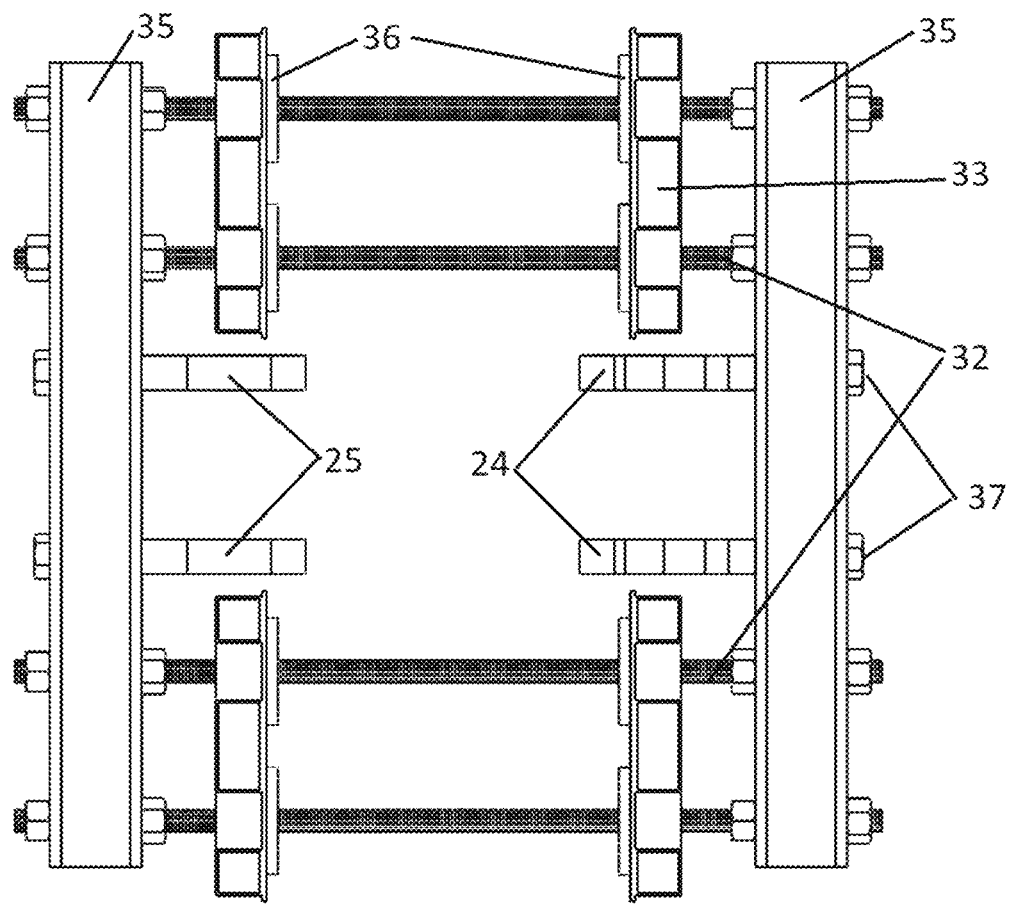
FIG. 13: the spring-fixtures (flat projection)

Spring fixture Assembly: Refer to FIG. 11, FIG. 12 and FIG. 13, Spring fixtures include two components in the left FIG. 11 and in the right FIG. 12. Spring fixtures are composed of mounting plates (33), on which the springs (10) are positioned by shoulders (36). the Threaded rods (32) link the mounting plates to the box beams (35), the threaded rods being held onto the box beams (35) by the bolts (34). The spring fixtures consists of two left and right portions, which are interlocked, where the rhombus performs compression movement, the guiding plates (24), (25) tend to move apart, then the springs are compressed to create balance with the compression force. This spring fixture design can be seen in FIG. 13. The left guiding plate (25) through the threaded rods (32) is connected to the right end of the springs (10), similar to the right guiding plate (24) through the threaded rods (32)) is connected to the left end of the springs (10), then the two guiding plates (24), (25) being pushed away will cause the springs (10) to compress.

Springs system: The springs system consists of 16 springs (10) compressed parallel to each other, the springs are fixed to the shoulders (36), with 8 springs arranged on each side.

With the above components, when the moving frame moves down, the springs are compressed and the length of the structure decreases. Then the rhombus structure will be flattened as shown in FIG. 14. The movement of the rhombus is passed to the guiding plate (24), (25) through the pivots $(14)_{1,2,3,4}$. Pivots (13) have the role of keeping the guiding groove moving without rotating during movement. When the rhombus structure is compressed, the four pivots $(14)_{1,2,3,4}$ have the motion according to arrows in FIG. 14. Analyze each movement of the pivots: the pair of pivots $(14)_{1,4}$ will move away from the pair of pivots $(14)_{2,3}$, this movement will cause the two guiding plates (24), (25) to move apart, the pivot $(14)_1$ and the pivot $(14)_4$ as well as the pivot $(14)_2$ and pivot $(14)_3$ will move closer together. When the rhombus is compressed, the pivots (14) touch the guiding plates and move them apart. On guiding plates with guiding grooves, these grooves adjust the displacement of the locating pivots on the rhombus to the displacement of the spring such that the rhombus's thrust force is constant, this condition is ensured by the formula below. The two guiding plate (24), (25) are fixed to the box beams (35), the left guiding plate is connected through the threaded rod with the right mounting plate and the right guiding plate is connected to the left mounting plate. Due to this structure such that the movement of the two guiding plate away will compress the springs again as can be seen in FIG. 15.

When the moving frame moves upwards, the process is completely reversed, the rhombus structure is stretched, the guiding grooves (24), (25) move closer together, the spring is stretched. FIG. 14 depicts the state of the spring-support mechanism for stretching and compression.

Figure 16:
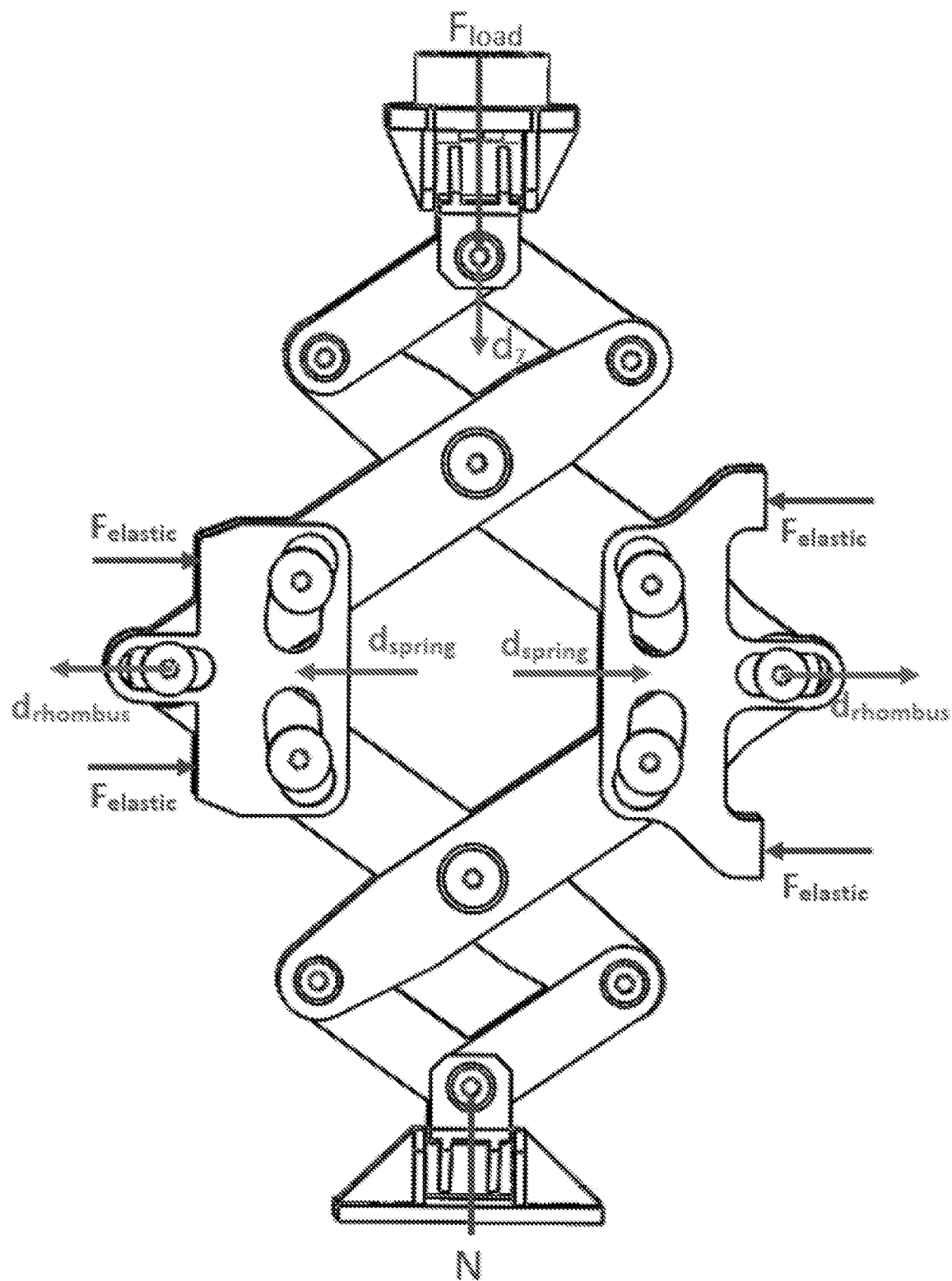
FIG. 16: the balance of load and elastic force (1)
Figure 17:
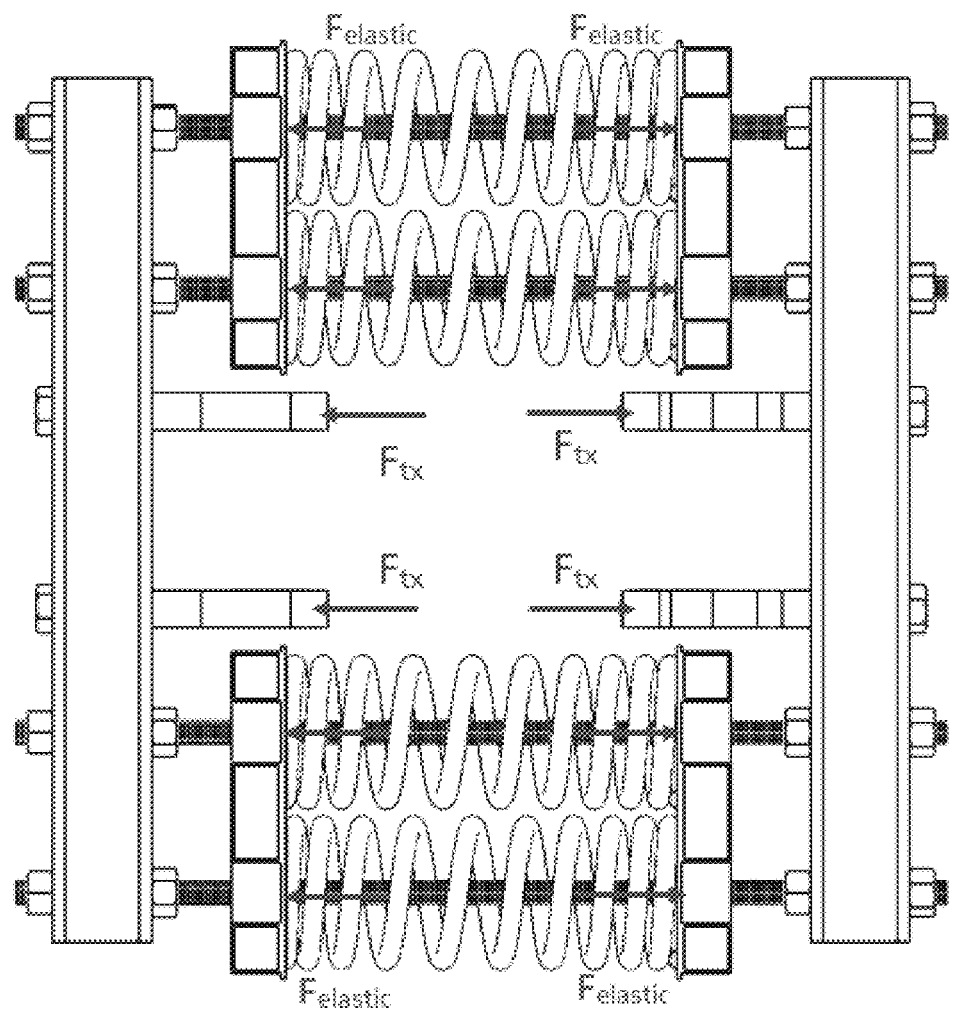
FIG. 17: the balance of load and elastic force (2).

Reference FIGS. 16 and 17, when the spring-support mechanism transpose a difference $d_z$, so two pivots (13) transpose a difference $d_{thoi}$, then two pivots (13) slide on the grooves (27)(29) and the guiding plate displace the spring a difference $d_{lx}$. When a compression force $F_{load}$ is applied to the support mechanism, F impact on the flange of the guiding plate to balance with the $F_{load}$ FIG. 16. Consequently, the spring generate a elastic force $F_{dh}$ to balance with the $F_{tx}$ FIG. 17.

Applying principle of virtual work to this structure, we have following formulation:

$$F_{elastic} d_{spring} = F_{load} d_z$$

$F_{elastic}$: the elastic force of the springs.

$F_{load}$: the force of the load impact on the support mechanism.

$d_{spring}$: differential displacement of springs (total displacement due to rhombus structure and adjustment of guiding groove).

$d_z$: The differential displacement of the moving frame.

$d_{spring}$ is calculated by the following formula:

$$d_{spring} = d_{rhombus} + d_{groove}$$

$d_{rhombus}$ differential displacement of pivots (14), depends on the texture, length of the edges of the rhombus.

$d_{groove}$ differential displacement of trajectory of groove (26), (28).

$F_{load}$ is gravity value of the load, for $d_z$ is the displacement of moving frame of robot, $d_{rhombus}$ will be a function of $d_z$ when we give the length of the edge, and the position of pivot (14), and a condition $x_{spring}(0)=z(0)=0$ we can calculate the trajectory of grooves $d_{groove}$ (26), (28).

What is claimed is:

1. The spring-support mechanism for a parallel robot comprising:
   Sets of rotated joints to adjust a first amount movement in a first direction of moving of a first portion of the spring support mechanism to match a second amount of movement in a second direction of moving of a second portion of the spring support mechanism;
   Springs having a length;
   a Rhombus mechanism with hinges in four vertices for transforming a displacement of the second portion of the spring support mechanism to an elasticity of springs;
   Guiding plates used to adjust the length of said springs so that a thrust force generated by said springs is constant; wherein
   Said springs comprise a set of springs assembled in parallel, and
   Comprising fixtures for said springs.

2. The spring-support mechanism for parallel robot according to claim 1, said Rhombus mechanism further comprising plural pivots, wherein:
   When the second portion of the spring support mechanism moves in the second direction, said springs are compressed and a length of the spring support mechanism decreases; Then the rhombus mechanism will be flattened, The movement of the rhombus mechanism is passed to the guiding plates through first ones of said plural pivots, When the rhombus mechanism is compressed, the first ones of said plural pivots touch the guiding plates and move them apart, wherein the guiding plates are provided with first guiding and second locating grooves, the locating grooves adjust the displacement of second ones of the pivots on the rhombus mechanism to a displacement of said springs such that a thrust force of the rhombus mechanism is constant.

3. The spring-support mechanism for parallel robot with constant force according to claim 2, wherein:
   When movement of the spring-support mechanism in the second direction transposes a displacement distance $d_z$, two of said first ones of said pivots transpose a distance $d_{thoi}$ in the first direction, then said two pivots slide on the grooves and the guiding plate displaces said springs a distance $d_{fx}$, When a compression force $F_{load}$ is applied to the support mechanism in the second direction, a force $F_{fx}$ impacts on a flange of the guiding plate to balance with the compression force $F_{load}$, Consequently, said springs generate an elastic force $F_{elastic}$ to balance with the force $F_{fx}$.

4. The spring-support mechanism for parallel robot with constant force according to claim 2, wherein:
   A trajectory $d_{groove}$ of the second of said ones of guiding grooves is determined to satisfy the following:

$$F_{elastic}d_{spring}=F_{load}d_z$$

where
   $F_{elastic}$: the elastic force of said springs;
   $F_{total}$: the force of the load impact on the support mechanism;
   $d_{spring}$: differential displacement of said springs (total displacement due to rhombus structure and adjustment of guiding groove);
   $d_z$: The differential displacement of the moving frame;
   $d_{spring}$ calculated by the following formula;

$$d_{spring}=d_{rhombus}+d_{groove}$$

$d_{rhombus}$ differential displacement of the first one of said plural pivots, depends on the texture, length of edges of the rhombus mechanism;
   $d_{groove}$ differential displacement of trajectory of grooves;
   $F_{load}$ is gravity value of the load, for $d_z$ is the displacement in the second direction, $d_{rhombus}$ will be a function of $d_z$ when we give the length of an edge of the rhombus mechanism, and a position of a respective one of the first one of said plural pivots, and a condition $x_{spring}(0)=z(0)=0$.

* * * * *